(12) United States Patent
McConica et al.

(10) Patent No.: US 7,959,245 B2
(45) Date of Patent: Jun. 14, 2011

(54) DEVICE AND METHOD FOR MEASURING INK LEVELS IN A CONTAINER

(75) Inventors: Charles H. McConica, Corvallis, OR (US); Erick B. Kinas, Camas, WA (US); Jefferson P. Ward, Brush Prairie, WA (US); Steven T. Castle, Philomath, OR (US); Loren E. Johnson, Corvallis, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 11/796,322

(22) Filed: Apr. 27, 2007

(65) Prior Publication Data

US 2008/0266565 A1    Oct. 30, 2008

(51) Int. Cl.
*B41J 2/195* (2006.01)
(52) U.S. Cl. ............................................. 347/7; 347/19
(58) Field of Classification Search ........................ 347/7
See application file for complete search history.

(56) References Cited

U.S. PATENT DOCUMENTS

| | | | | |
|---|---|---|---|---|
| 5,065,037 A | * | 11/1991 | Finney et al. ................... | 250/577 |
| 5,596,351 A | * | 1/1997 | Stapleton .................... | 346/140.1 |
| 5,616,929 A | | 4/1997 | Hara | |
| 5,661,506 A | * | 8/1997 | Lazzouni et al. .............. | 345/179 |
| 5,847,736 A | * | 12/1998 | Kanbayashi et al. ........... | 347/89 |
| 6,024,428 A | | 2/2000 | Uchikata | |
| 6,869,158 B2 | | 3/2005 | Kojima et al. | |
| 6,993,176 B2 | | 1/2006 | Yamagishi et al. | |
| 2005/0195225 A1 | * | 9/2005 | Takagi et al. .................. | 347/7 |
| 2006/0219106 A1 | * | 10/2006 | Sato ........................... | 101/128.4 |
| 2007/0013728 A1 | * | 1/2007 | Jung ............................. | 347/7 |

FOREIGN PATENT DOCUMENTS

EP   0753411 A2   1/1997

OTHER PUBLICATIONS

Please see attached Search Report for Application No. PCT/US2008/061158, filed on Apr. 22, 2008.

* cited by examiner

*Primary Examiner* — Matthew Luu
*Assistant Examiner* — Brian J Goldberg

(57) ABSTRACT

An ink level sensing device and associated method. The ink level sensing device includes a near infrared illumination source that emits near infrared light, and a container configured to accommodate a supply of ink containing light absorption material. The device further includes a protruding chamber adjacent to the container. The protruding chamber is configured to accommodate a portion of the supply of ink accommodated by the container. The device also includes a sensor that is configured to receive a signal based on an amount of the light that passes through the protruding chamber. The method includes emitting a light from a near infrared illumination source and directing the light toward a protruding chamber of the ink supply. The method further includes sensing an amount of the light that passes through the protruding chamber in the ink supply.

24 Claims, 4 Drawing Sheets

DEVICE AND METHOD FOR MEASURING INK LEVELS IN A CONTAINER

BACKGROUND

Many consumers desire to accurately and continuously measure the amount of ink within an ink supply, such as an ink cartridge in a printer. By doing so, consumers can be provided with information regarding not only the amount of ink remaining in a supply, but also the amount of time remaining before the ink is to be replaced.

Existing methods for measuring the ink in an ink supply include the drop counting method, low-on-ink detection binary measurement, and the human visual evaluation method. These methods and other existing methods for measuring the ink remaining in an ink supply have several problems. One typical problem with existing methods is the measurements are often not accurate and are more accurate when the supply of ink is at or near empty. Thus, the consumer is provided with a low-on-ink notification immediately before the ink supply is empty. Therefore, the consumer runs out of ink before he is able to purchase another supply.

Another problem with existing methods for measuring the ink level in an ink supply is that printer is not timely or accurately notified of a near empty ink level. So, the printer may dry fire a pen resulting in potential damage to the printer and/or pen.

Another common problem associated with existing ink level detection methods and devices is they do not notify the consumer of counterfeit inks within an ink supply. Identifying counterfeit ink in an ink supply is desirable because the consumer can be notified of the counterfeit ink and remove it from the printer before the counterfeit ink can contaminate the remaining genuine ink within a printer.

Devices and methods are continually being sought that will accurately measure the amount of ink within an ink supply and detect whether ink within the supply is counterfeit.

DETAILED DESCRIPTION

Figure 1:
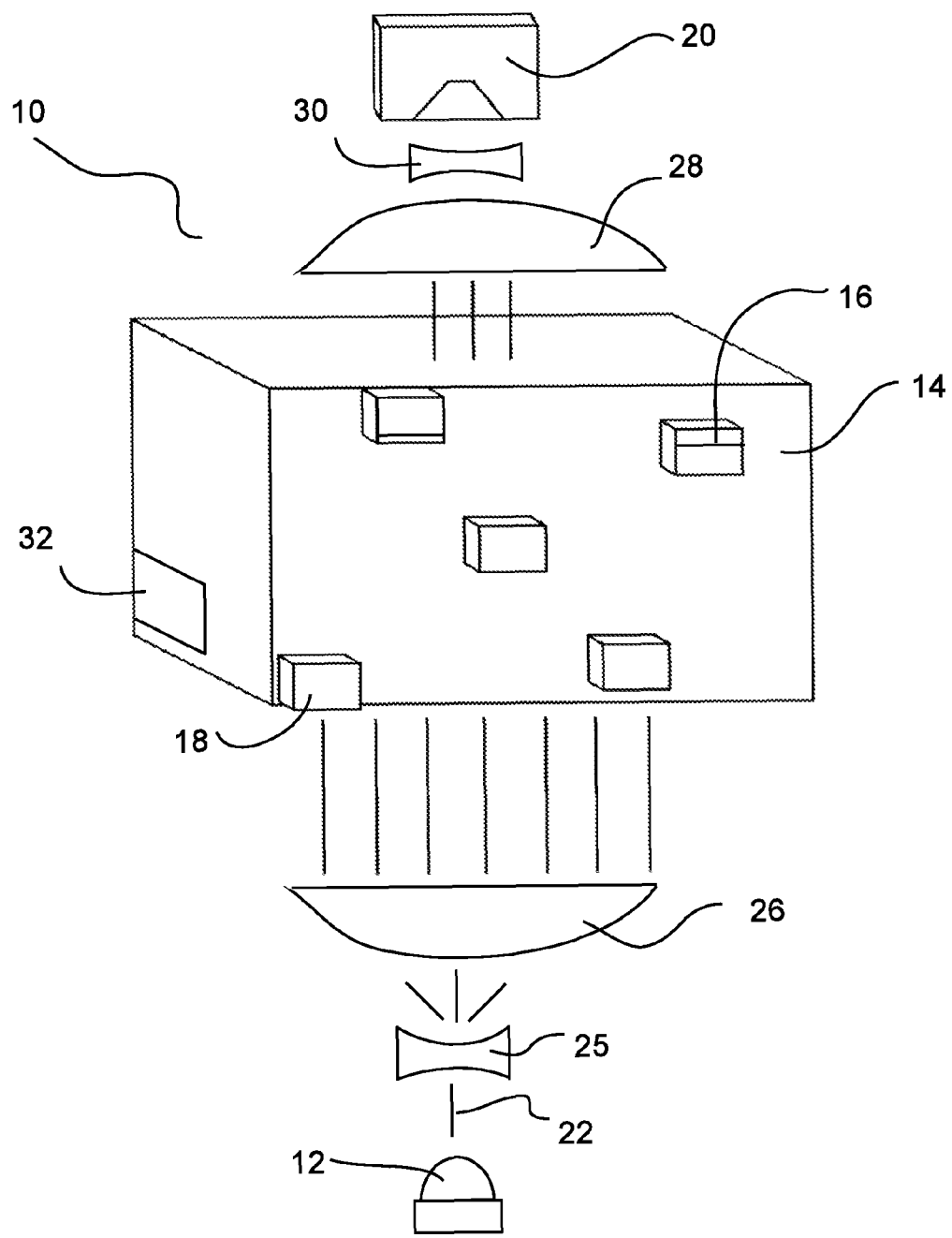
FIG. 1 is a perspective view of an ink level sensing device in accordance with one embodiment with a plurality of protruding chambers.

Before particular embodiments of the present device and method are disclosed and described, it is to be understood that the device and method are not limited to the particular process and materials disclosed herein as such may vary to some degree. It is also to be understood that the terminology used herein is used for the purpose of describing particular embodiments and is not intended to be limiting, as the scope of the present device and method will be defined only by the appended claims and equivalents thereof.

Reference will now be made to the exemplary embodiments illustrated in the drawings, and specific language will be used herein to describe the same. It will nevertheless be understood that no limitation of the scope of the device and method are thereby intended. Alterations and further modifications of the inventive features illustrated herein, and additional applications of the principles of the device and method as illustrations, which would occur to one skilled in the art and having possession of the disclosure, are to be considered within the scope of the device and method. Further, it is noted that the figures are not necessarily drawn to scale, but rather, are drawn to more clearly show embodiments of the present device and method.

In accordance with the before embodiments, various details are provided herein which are applicable to both the ink level sensing device and method of measuring ink levels in a container having an ink supply.

FIG. 1 illustrates an embodiment of an ink level sensing device 10. The ink level sensing device can include an illumination source, such as a near infrared illumination source 12 or a visible light source. A container 14 can also be configured to accommodate a supply of ink 16. The ink 16 can contain a light absorption material. The light absorption material can be outside the human visual spectrum, such as within the infrared or ultraviolet absorption range. Examples of light absorption material include near infrared absorbent dye, infrared absorbent dye and ultraviolet absorbent dye. In another embodiment, the light absorption material can be formulated to absorb light in the visual spectrum. In the embodiment where the light absorption material can be outside the human visual spectrum, it typically does not significantly affect the visual color of the various inks. In the embodiment using infrared absorbent material, the material may be a near infrared dye. The ink level sensing device can also include a protruding chamber 18 or chambers adjacent to the container configured to accommodate a portion of the supply of ink.

A sensor 20 can be configured to receive a signal based on an amount of the light 22 that passes through the protruding chamber 18. In one embodiment, the ink level sensing device is a continuous ink level sensing device. Accordingly, the ink level sensing device may be able to measure the height of the ink within container at substantially all height levels of the ink. The ink level sensing device 10 can also be configured to take periodic measurements. Alternatively, the ink level sensing device can be configured to take measurements only after the ink in the supply has dropped below a pre-defined level.

The near infrared illumination source 12 can be any source that emits near infrared light or infrared light. In one aspect, the near infrared illumination source can be a light emitting diode configured to emit near infrared light or illumination in the near infrared spectrum (e.g., from about 750 nm to about 940 nm).

The ink level sensing device 10 also comprises a sensor 20. The sensor can be any sensor configured to receive infrared signals. The sensor may be an un-filtered photo transistor sensor. In an exemplary embodiment, the unfiltered photo transistor sensor can have a peak response of about 855 nm wavelength.

The container 14 of the ink level sensing device 10 can be configured to accommodate a supply of ink 16 containing light absorption material. The container can be any container suitable to be positioned in a printer such as an ink-jet printer. According to one aspect, the container can be an ink cartridge.

The ink supply 16 can include a variety of liquid compositions in addition to a visible colorant and a light absorption material. The liquid compositions can be used to carry colorants and/or light absorption material to a printable media substrate. Such liquid compositions are known in the art and can include a mixture of a variety of different agents, including without limitation, surfactants, solvents, co-solvents, buffers, biocides, viscosity modifiers, sequestering agents, stabilizing agents, and water. In some aspects, the liquid compositions can also include other additives such as polymers, UV curable materials, latexes, and/or plasticizers.

The protruding chamber 18 can take on a variety of different embodiments. The protruding chamber or chambers can be formed simultaneously with the ink container via a molding process. The protruding chamber or chambers can be made of a material that will allow the passage of infrared or near infrared light. Typically, the protruding chamber is positioned adjacent to a wall of the container 14. In one aspect, the protruding chamber extends outward from a wall of the container. Accordingly, the chamber can be made from the same material that makes up the container. Conversely, the chamber can be a different material than the remaining body of the container.

Figure 2:
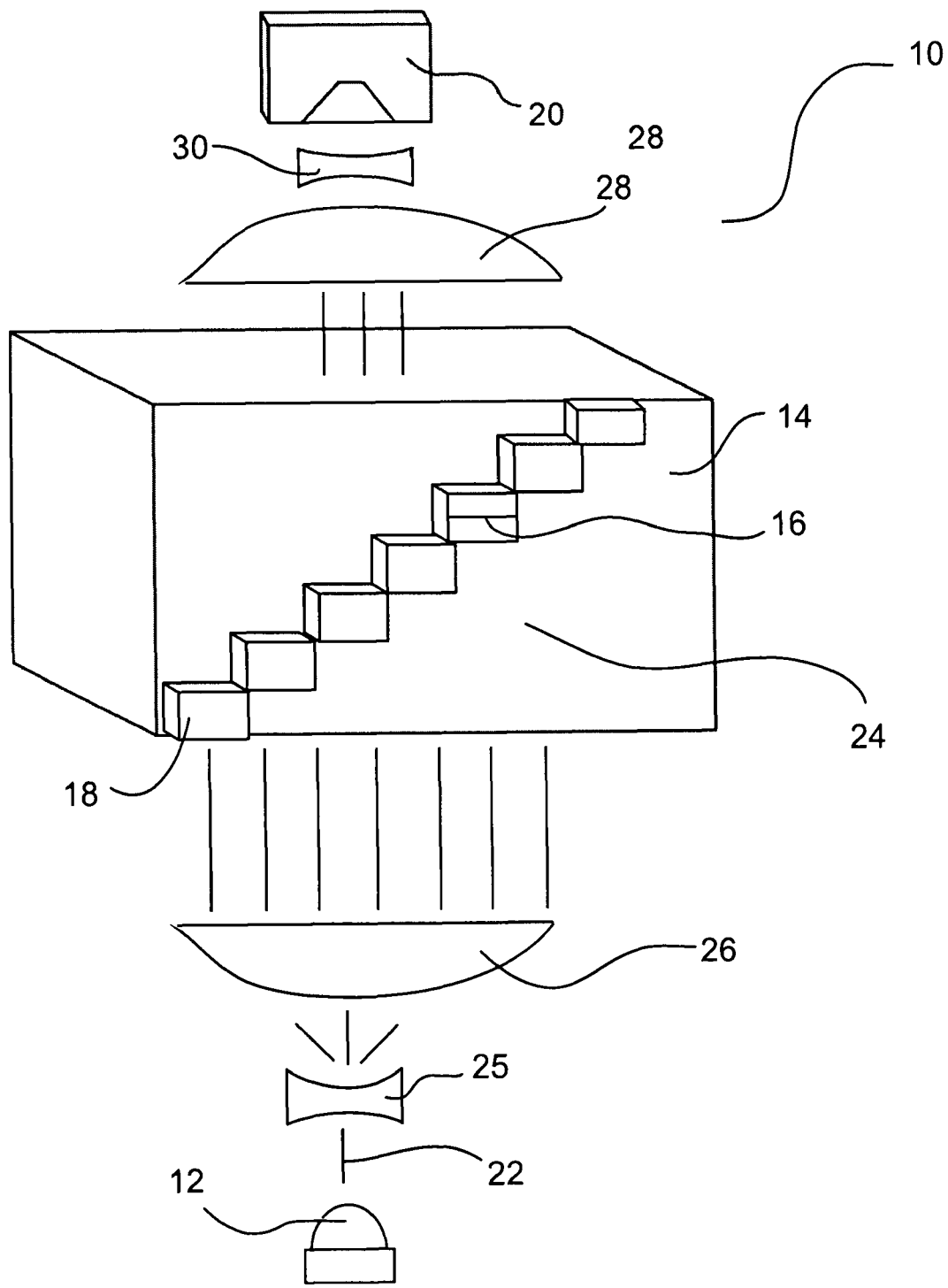
FIG. 2 is a perspective view of an ink level sensing device shown in accordance with another embodiment wherein a plurality of protruding chambers are arranged in a staircase fashion.

As shown in FIGS. 1 and 2, the ink level sensing device 10 comprises a plurality of protruding chambers 18. With regard to FIG. 1, the plurality of protruding chambers can be arranged in a predefined pattern such that a side wall of one protruding chamber is vertically aligned with a side wall of another chamber, thereby reducing the passage of light 22 between the protruding chambers. As shown in FIG. 2, the plurality of protruding chambers can be arranged in a staircase like arrangement 24 on a wall of the container 14. The embodiment shown in FIG. 2 can be advantageous in the sense that an ink level measurement can be provided throughout the entire range of possible ink levels.

Figure 3:
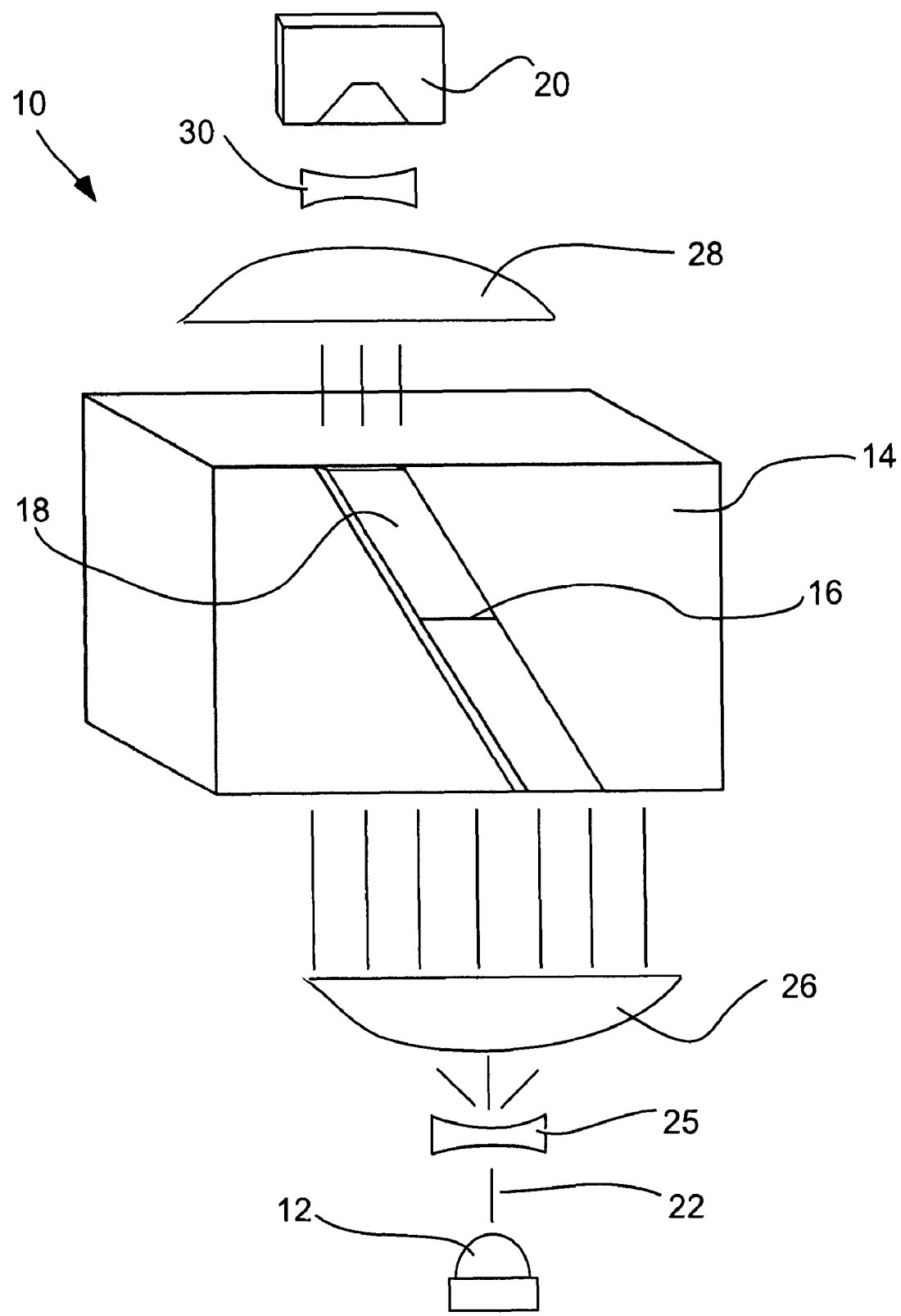
FIG. 3 is a perspective view of an ink level sensing device in accordance with one embodiment wherein a single protruding chamber extends across an ink container.

As shown in FIG. 3, the protruding chamber 18 can be a single continuous chamber extending from a top portion of the container 14 to a bottom portion of the container. The single continuous chamber can be positioned at an angle from horizontal. This configuration allows any ink 16 within the continuous chamber to drain completely to the bottom of the chamber, and little if any ink can become trapped in a corner of the chamber.

As is shown in FIGS. 1-3, the ink level sensing device 10 can also comprise a plurality of lenses for directing the light from the near infrared illumination source toward the protruding chamber. In one embodiment, the plurality of lenses can comprise a first diffuser lens 25 positioned between the protruding chamber 18 and the near infrared illumination source 12. In addition, the ink level sensing device can comprise a set of plano convex converging lenses or collimating lenses. A first plano convex converging lens 26 can be positioned between the near infrared illumination source and the protruding chamber, and a second plano convex converging lens 28 can be positioned between the protruding chamber and the sensor 20. The flat surface of both plano convex converging lenses can face the protruding chamber. In one embodiment, a separate plano convex lens can exist for each protruding chamber on the wall of the container. Alternatively, a single set of plano convex converging lenses may be used, as shown in FIGS. 1-3. A second diffuser lens 30 can be positioned between the second plano convex converging lens and the sensor.

Figure 4:
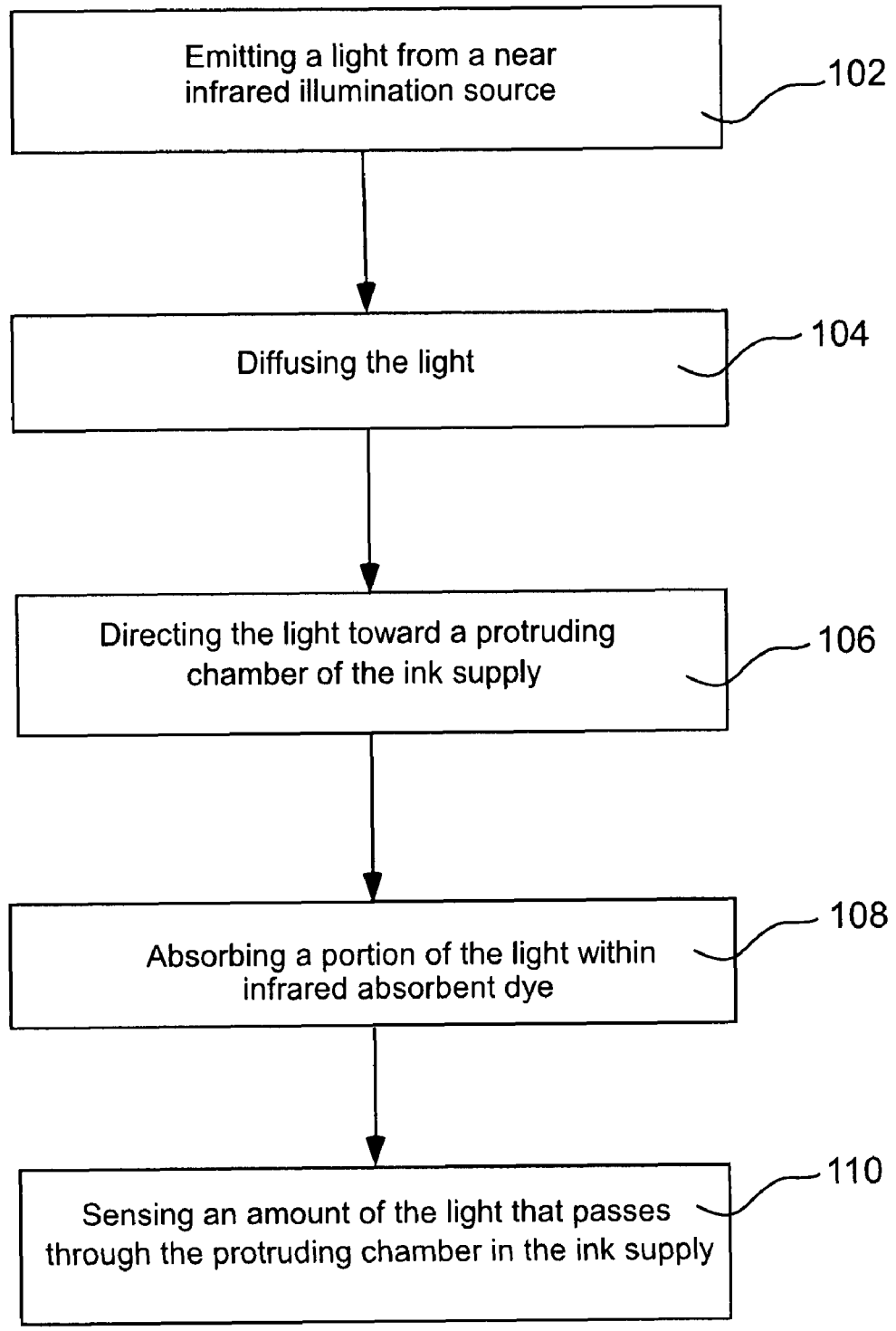
FIG. 4 is a flow chart of an embodiment of a method showing the relationship between the operations of the method.

Referring specifically to FIG. 4, the present method is drawn to measuring ink levels in a container having an ink supply including light absorption material, such as infrared absorbent dye. The method includes emitting a light from a near infrared illumination source, as in block 102. The method also includes directing the light toward a protruding chamber of the ink supply, as in block 106, and sensing an amount of the light that passes through the protruding chamber in the ink supply, as in block 110.

In another embodiment, the method can include absorbing a portion of light within the light absorption material contained in the protruding chamber, as shown in block 108. The method can also include the operation of diffusing the light, as shown in block 104. The light may be diffused after it is emitted from the illumination source. Diffusing the light enables the light to reach a broader surface area of the protruding chamber to which the light is directed. In a further embodiment, light can be collected after it passes through the protruding chamber and before it is sensed.

The operation of absorbing a portion of light within the light absorption material, as shown in block 108, is typically dependent upon the amount of ink within the protruding chamber. By way of example, if one unit of thickness of ink can transmit 60% of the light it receives, then one unit of thickness of ink within the protruding chamber will transmit 60% of the light it receives. If however, the protruding chamber contains two units of thickness of ink, the first unit can transmit 60% of the light it receives. Thus, the second unit of thickness only receives 60% of the light that initially entered the chamber and the second unit can only transmit 60% of the amount it received. Thus, according to this example, two units thickness of ink within a protruding chamber will transmit about 36% of the light that originally entered the chamber. The remaining 64% of light that enters the chamber can be absorbed by the light absorption material in the ink within the protruding chamber. Accordingly, the amount of light that passes through the protruding chamber can increase as the amount of ink within the protruding chamber decreases. In addition, the amount of light or illumination that is sensed by a sensor is substantially equal to the amount of light emitted from a near infrared illumination source minus the absorption by any light absorption material within the protruding chambers.

Once light is emitted from the near infrared illumination source and directed toward a protruding chamber of the ink container, some light may pass through the protruding chamber in the ink supply depending on the amount of ink within the chamber. For example, a chamber that is full of ink will allow only a minimal amount, if any, light to pass therethrough. Conversely, a chamber that is less than full may allow a portion of light to pass therethrough, and a chamber that is empty will allow nearly all of the light that enters to pass therethrough. Thus, the portion of light absorbed within the protruding-chamber and the amount of light that passes through the chamber is largely dependent upon a level of light absorption material within the protruding chamber.

The operation of absorbing a portion of the light within light absorption material, as shown in block 108, can also depend on the composition of the light absorption material. Infrared dye or infrared absorbent dye refers to a certain type of dye that is colorless or pale in color within the visible spectrum when present at a low concentration in a liquid vehicle such as ink. In accordance with one aspect, the ink supply can comprise infrared absorbent dye combined with one or more visible color ink formulations. The dyes used in connection with the present device and method can be termed infrared light absorbent dyes because each has a level of absorbance within the infrared spectrum. Conversely, an ink having a visible color can be formulated to absorb little or no infrared light. In accordance with one embodiment, the composition of the infrared absorbent dye results in absorption of light outside the dominant absorption ranges of the various visible light colorants used in an ink set, e.g., cyan, magenta and yellow. The near infrared dye within the ink does not typically affect the visible color performance of the ink and the ink colorants do not strongly affect the near infrared dye absorbance.

In one embodiment, an ink set used in accordance with the present method can comprise a cyan ink including a cyan colorant, a magenta ink including a magenta colorant, and a yellow ink including a yellow colorant. These three inks of an ink set can include an infrared absorbing dye and have an overlapping infrared absorbance range with respect to one another. Optionally, the cyan ink, the magenta ink, and the yellow ink may be formulated to each absorb infrared light or energy at least substantially the same as one another. It may also be useful to formulate all three inks to absorb common infrared energy or illumination. In one embodiment, the cyan ink, the magenta ink, and the yellow ink can include the identical infrared absorbing dye. Since cyan may have some absorption within the infrared spectrum, often cyan may be formulated with less infrared dye than the magenta ink and the yellow ink, though this is not required. If, on the other hand, the goal is to cause all three inks to appear the same to the sensor, the inks can be formulated to have similar infrared absorption.

In accordance with one embodiment, the emitted light can travel through a number of different illumination paths. The light can be emitted from an illumination source positioned opposite a sensor for sensing an amount of light that passes through a protruding chamber in the ink supply. For example, the light can be transmitted from a position above the ink supply and the light can be sensed from a position below the ink supply. This means the illumination or light can travel straight through the height of the ink in a chamber. Thus, mirrors and/or prisms are not required for directing the light to a sensing source, although mirrors and/or prisms may be useful in some embodiments for directing the light, depending on the positions of the illumination source and sensing source with respect to each other.

Now referring specifically to the operation of directing the light toward a protruding chamber of the ink supply, as shown in block 106, the light can be directed from the illumination source to the protruding chambers via a plurality of lenses. In a further embodiment, the light can also be collected from the protruding chamber via at least one lens. For example, light may be emitted from a near infrared illumination source and can be passed through a concave diffuser lens before reaching the protruding chamber. The concave diffuser lens enables the light to spread and fan out so as to reach a full length of a surface of the protruding chamber or chambers positioned across the ink supply container.

The light can also pass through a plano-convex converging lens after passing through the diffuser lens and before it reaches the protruding chamber. The plano-convex converging lens can guide the light in a direction that is substantially perpendicular or at a 90 degree angle with respect to a free surface of any ink within the protruding chamber. The free surface refers to the top surface of the ink (without waves). If the light comes into contact with ink within the supply at any orientation other than a perpendicular orientation, the infrared light or illumination can refract off of the surface and thus will not pass through the chamber and to the sensor. Light that is refracted will not reach the sensor and thus the sensor will treat the refracted light as if it were absorbed within the infrared absorbent dye in the protruding chamber. This can result in an inaccurate signal, which can indicate that there is more ink in the container than is actually present. In addition, the protruding chambers can be configured to minimize the width of the free surface of the ink. By controlling the free surface width, it may be possible to ignore the effect of refraction as minimal as compared to the rest of the transmitted light. This width control is used to minimize the effect of the free ink surface refraction for the embodiment shown in FIG. 3.

In a further embodiment, light that is not absorbed by light absorbent dye within the protruding chamber can pass through the protruding chamber and be re-directed toward a sensor. As described, the light may be re-directed via one lens or a plurality of lenses. For example, the plano-convex lenses can be broken into segments, in a manner analogous to a Fresnel lens, and the plano-convex lens segments may be incorporated into the bottom and or top faces of the protruding chambers. This approach can be most easily visualized in the embodiments shown in FIG. 1 and FIG. 2. An extension of this approach can also be applied to the embodiment shown in FIG. 3.

The present method provides a measurement based on the amount of ink within the container. This measurement is based upon a signal or a series of signals received by the sensor. The strength of the signal received by the sensor can increase as the supply of ink within the container decreases. Calibration of the sensor's signal is important for the accuracy of each individual printer. The empty signal is one signal that can benefit from calibration. Calibration can be accomplished by adding a simulated ink supply body that is dry/empty to the printer. The empty signal can be measured using the illumination source and sensor at the time the ink levels are measured. The simulated ink supply and all the other color ink supplies can be positioned between the illumination source and sensor.

The method of measuring ink levels in a container having an ink supply including an infrared absorbent dye can be continuous, meaning that ink levels are measured over a continuous range. As a result, the printer, computer, and user can be aware of the amount of ink remaining in the ink container regardless of how much ink is in the container. In addition, frequent sampling can make the reading more accurate.

In a further embodiment, counterfeit ink within the ink supply can be identified before the ink is able to contaminate any genuine ink within the supply. Genuine ink is typically ink which is configured specifically for use in connection with a specific type or brand of printer. For example, where a counterfeit ink does not include the near infrared absorbent dye, light or illumination from the near infrared illumination source will not be absorbed and more light can reach the sensor. Accordingly, the signal produced by the sensor would indicate that the ink supply is at or near empty. Typically, a printer associated with the method would have previously sensed that there was a change in the ink supply, and so would anticipate that the new supply was at or near full. Upon receiving a signal that the supply was at or near empty, the printer or computer would notify the user/consumer that the new supply is either empty and should not be used to prevent dry firing damage, or that the supply contains counterfeit ink.

The ink container may also include an electronic ink memory module 32 (see FIG. 1) that tracks the expected amount of ink remaining in the ink supply based on the amount of printing performed. This expected amount of ink can be compared to the measured ink level in the ink supply. The measurement can be performed using an embodiment of the present system and method having an illumination source and protruding chambers and/or structures as described in detail previously.

If the ink level measurement is substantially lower then the amount of ink expected by the memory device, then the ink can be suspected of being a counterfeit ink. As a result, the customer can be informed of this concern. If the customer decides to continue and use this suspected counterfeit ink, the printer and ink supply may operate in a manner that minimizes the potential harmful effects of using this suspected counterfeit ink.

It is to be understood that the above-referenced arrangements are illustrative of the application for the principles of the present device and method. Numerous modifications and alternative arrangements can be devised without departing from the spirit and scope of the present device and method. It will be apparent to those of ordinary skill in the art that numerous modifications can be made without departing from the principles and concepts of the device and method as set forth in the claims.

The invention claimed is:

1. A method of measuring ink levels in a container having an ink supply including a light absorption material comprising:
   a) emitting a light from an illumination source;
   b) directing the light toward a protruding chamber of the container;
   c) sensing an amount of the light that passes through the protruding chamber in the ink supply and that is not absorbed by ink in the protruding chamber including the light absorption material.

2. The method of claim 1, wherein directing the light toward a protruding chamber is accomplished by using a plurality of lenses.

3. The method of claim 1, wherein emitting a light from an illumination source comprises emitting a light from a near infrared illumination source, and the method further comprises diffusing the light emitted from the near infrared illumination source so as to enable the light to reach a full length of the protruding chamber.

4. The method of claim 1, further comprising absorbing a portion of the light within the light absorption material contained in the protruding chamber.

5. The method of claim 4, wherein the portion of light absorbed within the protruding chamber and the amount of light that passes through the chamber is dependent upon a level of light absorption material within the protruding chamber.

6. The method of claim 1, further comprising redirecting the light that passes through the protruding chamber toward a sensor using at least one lens.

7. The method of claim 1, wherein the method of measuring ink levels in an ink supply is continuous.

8. The method of claim 1, wherein the light absorption material is selected from the group consisting of infrared absorbent dye, near infrared absorbent dye, and ultraviolet light absorbent dye.

9. The method of claim 1, further comprising identifying an expected remaining ink level as compared to a measured ink level using an ink memory module, and when the measured ink level and expected remaining ink level are different then the ink memory module reports possible counterfeit ink.

10. An ink level sensing device comprising:
   a) a near infrared illumination source that emits near infrared light;
   b) a container configured to accommodate a supply of ink containing infrared absorbent dye;
   c) a protruding chamber adjacent to the container configured to accommodate a portion of the supply of ink; and
   d) a sensor configured to receive a signal based on an amount of the light that passes through the protruding chamber and that is not absorbed by ink in the protruding chamber.

11. The ink level sensing device of claim 10, wherein the ink level sensing device is a continuous ink level sensing device.

12. The ink level sensing device of claim 10, wherein the protruding chamber is a single continuous chamber extending from a top portion of the container to a bottom portion of the container.

13. The ink level sensing device of claim 10, further comprising a plurality of protruding chambers.

14. The ink level sensing device of claim 13, wherein the plurality of protruding chambers is arranged in a staircase on a wall of the container.

15. The ink level sensing device of claim 13, wherein the plurality of protruding chambers is arranged in a pre-defined pattern such that a side wall of one protruding chamber is vertically aligned with a side wall of another chamber, thereby reducing the passage of light between the protruding chambers.

16. The ink level sensing device of claim 10, further comprising a plurality of lenses for directing the light from the near infrared illumination source toward the protruding chamber, and from the protruding chamber to the sensor.

17. The ink level sensing device of claim 16 wherein the plurality of lenses comprises a first concave diffusing lens positioned between the protruding chamber and the near infrared illumination source.

18. The ink level sensing device of claim 17, further comprising a first plano convex converging lens positioned between the near infrared illumination source and the protruding chamber, and a second plano convex converging lens positioned between the protruding chamber and the sensor.

19. The ink level sensing device of claim 18, further comprising a second concave diffusing lens positioned between the second plano convex converging lens and the sensor.

20. The ink level sensing device of claim 10, wherein the near infrared illumination source is a light emitting diode.

21. The ink level sensing device of claim 10, wherein a strength of the signal received by the sensor increases as the supply of ink within the container decreases.

22. The ink level sensing device of claim 10, further comprising an ink memory module configured to identify an expected remaining ink level as compared to a measured ink level, and when the measured ink level and expected remaining ink level are different, the ink memory module reports possible counterfeit ink.

23. An ink level sensing device, comprising:
   a) a near infrared illumination source that emits near infrared light;
   b) a container configured to accommodate a supply of ink containing infrared absorbent dye;
   c) a plurality of chambers protruding from the container in a predefined pattern, the plurality of chambers being configured to accommodate a portion of the supply of ink;
   d) a sensor configured to receive a signal based on an amount of the light that passes through the plurality of chambers and that is not absorbed by ink in the plurality of protruding chambers; and
   e) a plurality of lenses configured to direct the light from the near infrared illumination source to the plurality of protruding chambers, and further configured to direct the light passing through the plurality of protruding chambers to the sensor.

24. The ink level sensing device of claim 23, further comprising an ink memory module configured to identify an expected remaining ink level as compared to a measured ink level, and when the measured ink level and expected remaining ink level are different, the ink memory module reports possible counterfeit ink.

* * * * *